(12) United States Patent
Yasuo

(10) Patent No.: US 6,790,401 B2
(45) Date of Patent: Sep. 14, 2004

(54) METHOD FOR MANUFACTURING A BOWLING PIN

(76) Inventor: Tejima Yasuo, 4232-2 Ubumi, Yuto-cho, Hamana-gun, Shizuoka-ken (JP)

(*) Notice: Subject to any disclaimer, the term of this patent is extended or adjusted under 35 U.S.C. 154(b) by 0 days.

(21) Appl. No.: 10/169,886
(22) PCT Filed: Nov. 12, 2001
(86) PCT No.: PCT/JP01/09864
§ 371 (c)(1), (2), (4) Date: Oct. 29, 2002

(65) Prior Publication Data
US 2003/0109317 A1 Jun. 12, 2003

(30) Foreign Application Priority Data
Nov. 10, 2000 (JP) .................................... 2000-344161
May 24, 2001 (JP) .................................... 2001-155320

(51) Int. Cl.⁷ .............................................. B29C 45/14
(52) U.S. Cl. ..................... 264/275; 264/328.8; 473/119
(58) Field of Search .......................... 264/275, 328.8, 264/328.7, 241, 259, 271.1, 278, 279.1, 328.1; 473/119; 425/121, 126.1, 553, 554, 577, 588

(56) References Cited

U.S. PATENT DOCUMENTS

| | | | | |
|---|---|---|---|---|
| 3,229,978 A | * | 1/1966 | Guglielmo, Sr. .............. | 473/119 |
| 3,971,837 A | * | 7/1976 | Hasegawa et al. .......... | 264/46.6 |
| 4,457,511 A | | 7/1984 | Witkowski | |
| 5,080,842 A | * | 1/1992 | Jager ........................... | 264/45.5 |
| 5,354,239 A | * | 10/1994 | Mueller ....................... | 473/119 |
| 5,630,762 A | * | 5/1997 | Mueller ....................... | 473/119 |
| 5,655,970 A | * | 8/1997 | Jager ........................... | 473/118 |

FOREIGN PATENT DOCUMENTS

| | | |
|---|---|---|
| JP | 49-20272 | 2/1974 |
| JP | 49-126446 | 12/1974 |
| JP | 59-8984 | 1/1984 |
| JP | 10-234929 | 9/1998 |
| JP | 3055601 | 10/1998 |

OTHER PUBLICATIONS

International Search Report—PCT/JP01/09864; ISA/JPO, Feb. 2, 2002.

* cited by examiner

Primary Examiner—Michael Colaianni
Assistant Examiner—Monica A. Fontaine
(74) Attorney, Agent, or Firm—Harness, Dickey & Pierce, P.L.C.

(57) ABSTRACT

A plastic bowling pin and method for manufacturing the bowling pin uses a first mold 8 having first axial rods 9 and 10 displaceable into and from the first molding cavity along a longitudinal axis "a" and a second mold 15 having second axial rods 16 and 17 displaceable into and from the second molding cavity along a longitudinal axis "b". Molding a core portion 2 by forcing the molten synthetic resin to be flowed into the first molding cavity of the first mold 8 after the first axial rods 9 and 10 have been inserted into the first molding cavity. Molding a skin layer 3 on the external surface of the molded core portion 2 by forcing the molten synthetic resin to be flowed into a space between the external surface of the molded core portion 2 and the second molding cavity of the second mold 15 after the molded core portion 2 has been positioned relative to the second molding cavity. Inserting the second axial rods 16 and 17 into apertures formed in the core portion 2 by the first axial rods 9 and 10.

5 Claims, 12 Drawing Sheets

METHOD FOR MANUFACTURING A BOWLING PIN

CROSS-REFERENCE TO RELATED APPLICATIONS

This application claims the benefit of PCT application PCT/JP01/09864 filed Nov. 12, 2001 which claims priority on Japanese Patent Application No. 2000-344161 filed Nov. 10, 2000 and Japanese Patent Application No. 2001-155320 filed May 24, 2001.

TECHNICAL FIELD

The present invention relates to a plastic bowling pin and a method for manufacturing the plastic bowling pin.

BACKGROUND ART

In general, the bowling pin has been manufactured by cutting a blank of laminated wood into a original bowling pin configuration and then by applying synthetic resin on the surface of the cut-out pin. In use, the bowling pin is damaged by impacts during the game and thus it is necessary to repair the damaged pins or discard them by burning.

In the wooden bowling pin, it has been discarded in burning only the wood portion thereof after the synthetic resin was cut and removed from the pin surface since the burning of the synthetic resin applied on the pin surface would generate harmful substances causing air pollution, or it has been regenerated with applying again new synthetic resin on the damaged surface. However, the cutting of only the synthetic resin from the pin surface is cumbersome and increases the discarding cost or the regeneration cost.

In view of these actual circumstances, it has been proposed to form whole a bowling pin of synthetic resin. According to such a plastic bowling pin, it is possible to regenerate the damaged pin, eliminate the discarding cost and reduce the regenerating cost since the damaged bowling pin of synthetic resin can be wholly melted and regenerated again to a new bowling pin by forcing the molten resin to be flowed into a mold for forming the bowling pin.

However, there are following problems in conventional plastic bowling pins.

Since the bowling pin suffers from severe impact in its use, it must be made of plastic material having high durability. The synthetic resin of high durability is generally expensive and therefore it would be enormously expensive if whole the bowling pin is made of such plastic material of high durability. Accordingly, the plastic bowling pin is usually formed of two portions, that is, a core portion made of cheap plastic material of general purpose and a skin layer covering the core portion made of special plastic material having high durability.

In order to form the skin layer on the core portion by using synthetic resin different from that of the core portion, it is necessary to use both a mold for molding the core portion and a mold for molding the skin layer. In this case, it is necessary to form the skin layer so that it has a substantially constant thickness around the molded core portion and therefore there is a problem that the exact positioning of the molded core portion relative to the mold for molding the skin layer is very difficult.

On the other hand, when the whole bowling pin is formed of synthetic resin there is a problem that it is difficult to obtain exact configuration, weight etc. since the massive synthetic resin forming the bowling pin often tends to leave sink marks on its surface. Since the bowling pin is ruled in detail in its specification as to not only its configuration, but its weight, the position of the center of gravity and the bounce property, a bowling pin having deficiencies in the configuration etc. caused by the sink marks cannot be used in playing games.

It is therefore an object of the present invention to provide a plastic bowling pin and method for manufacturing the bowling pin in which exact configuration etc. defined in the rules can be obtained with avoiding deficiencies such as sink marks during the molding process as well as improving the efficiency or operability in molding the bowling pin.

DISCLOSURE OF THE INVENTION

According to the present invention, a method for manufacturing a plastic bowling pin includes using a first mold having a first molding cavity of a smaller dimension than the predetermined outside dimension of the bowling pin and having first axial rods each having a predetermined diameter and displaceable into and from the first molding cavity along a longitudinal axis. A second mold is used that has a second molding cavity of a substantially same dimension as the outside dimension of the bowling pin and having second axial rods each having a predetermined diameter and displaceable into and from the second molding cavity along a longitudinal axis. The method comprises steps of; molding a core portion of the bowling pin by forcing molten synthetic resin to be flowed into the first molding cavity of the first mold after the first axial rods have been inserted into the first molding cavity; removing the first axial rods therefrom after the synthetic resin has been solidified; molding a skin layer on the external surface of the molded core portion by forcing molten synthetic resin to be flowed into a space between the external surface of the molded core portion and the second molding cavity of the second mold after the molded core portion has been positioned relative to the second molding cavity with inserting the second axial rods into an aperture formed in the core portion by the first axial rods.

In this method, since the apertures are formed by the first axial rods in the core portion both on the top and bottom ends, it is possible to reduce the mass of the core portion and it is also possible to adjust the weight etc. by controlling the dimension of the apertures. Accordingly, it is possible to obtain exact configuration etc. defined in the rules with avoiding deficiencies such as sink marks during the molding process.

Also according to the invention, since the second axial rods are inserted into the apertures formed by the first axial rods during the molding of the skin layer, it is possible to achieve the exact positioning of the core portion relative to the second mold during the molding of the skin layer and thus to improve the operability or efficiency in molding the bowling pin.

According to the present invention the method further comprising a step of press fitting plastic plugs into the apertures formed in the bowling pin by the first and second axial rods after the skin layer has been molded.

In this method, since the plastic plug can be easily removed from the bowling pin, it is possible to reuse the removed plug to the regenerated bowling pin.

According to the present invention, the first and second axial rods are respectively formed by a pair of bar members each displaceable into and from the opposite ends of the first and second molding cavities of the first and second molds.

In this method, since the apertures are formed by the first axial rods in the core portion both on the top and bottom ends thereof, it is possible to reduce the mass of the core portion at regions other than the constricted portion and thus effectively prevent sink marks. Also since the second axial rods are inserted to the apertures formed on the top and bottom ends, it is possible to further improve the accuracy of positioning of the core portion relative to the second molding cavity of the second mold.

According to the present invention, the pair of bar members of the first axial rods are adapted to be abutted at their tip ends, and the core portion molding step is carried out under a condition of the tip ends being abutted.

In this method, since a through aperture is formed in the core portion from the top end to the bottom end thereof, it is possible to reduce the mass of the core portion in all regions including the constricted portion.

According to the present invention, the forced flow of the molten synthetic resin into the first and second molding cavities is carried out by injection, and the injection in the skin layer molding step is carried out at a position out of the center of gravity of the bowling pin.

In usual, it is recognized that the synthetic resin near the injection port is cooled and solidified later than that of other portions and thus has lesser rigidity than that of the synthetic resin forming other portions. On the other hand, the bowling pin is struck at the position of the center of gravity and suffers from an excessive impact at that position. Accordingly, if the position of the injection port would be arranged at a position corresponding to the center of gravity, the rigidity of the bowling pin thereat will be reduced and thus the life time of the bowling pin will be also reduced. Accordingly, since the injection in the skin layer molding step is carried out at a position out of the center of gravity of the bowling pin, it is possible to ensure the rigidity of the bowling pin at the position of the center of gravity and maintain a long life time of the bowling pin.

According to the present invention, the bowling pin has apertures within a core portion of the bowling pin formed by the first axial rods as well as an opening of the skin layer of the bowling pin formed by the second axial rods.

In this bowling pin, since it has the apertures within the core portion formed by the first axial rods and the opening of the aperture in the skin layer formed by the second axial rods, it is possible to provide a high quality plastic bowling pin in which its whole weight exactly corresponds to the ruled weight and there is not any sink mark on its surface.

DETAILED DESCRIPTION OF THE PREFERRED EMBODIMENT

Several embodiments of the present invention will be hereinafter described with reference to the accompanied drawings.

Figure 1:
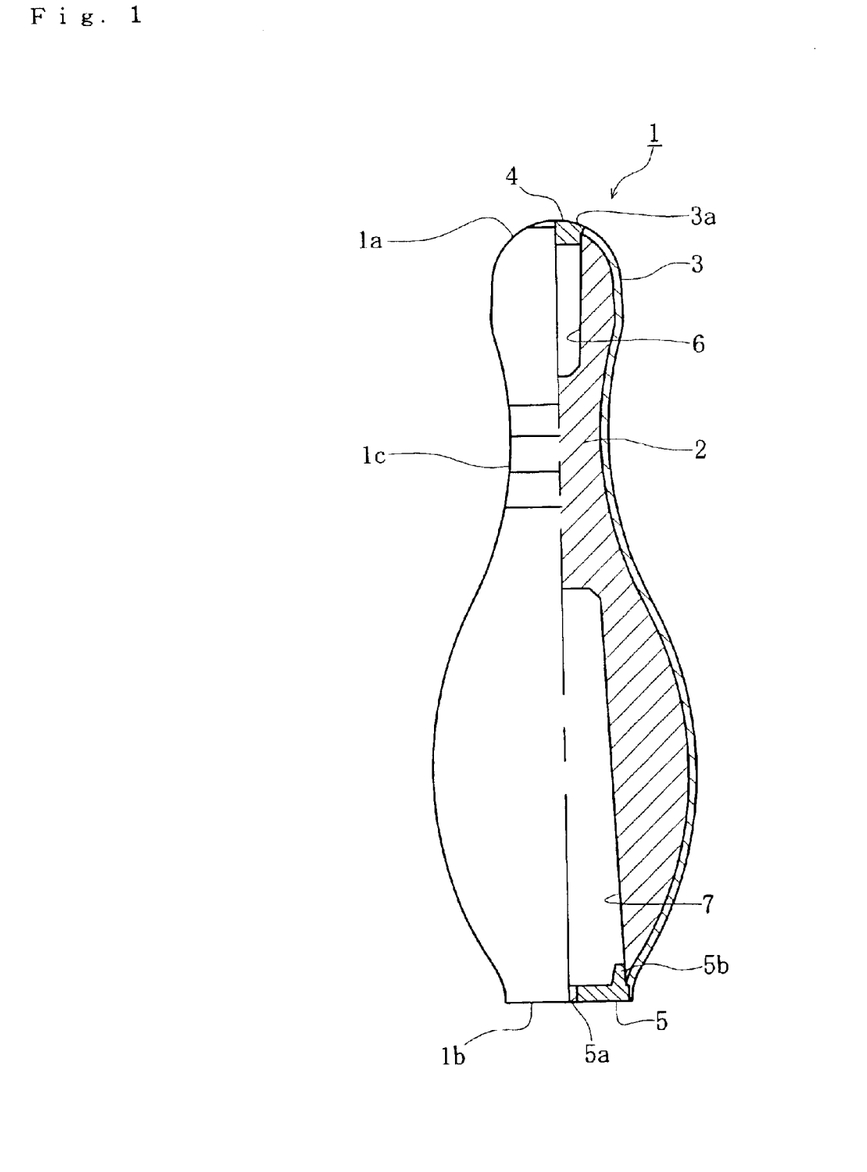
FIG. 1 is a side elevational view partially in section of a plastic bowling pin according to a first embodiment of the present invention.

As shown in FIG. 1, a plastic bowling pin 1 according to a first embodiment of the present invention generally comprises a core portion 2, a skin layer 3 and top and bottom nylon plugs 4 and 5 respectively arranged at top and bottom ends 1a and 1b of the bowling pin 1.

The core portion 2 is formed mainly of nylon family resin (e.g. synthetic resin comprising nylon and polypropylene (PP)) and has an upper aperture and a lower aperture 7 within the core portion 2 communicating with the top end 1a and the bottom end 1b, respectively. The upper aperture 6 is formed as having a taper decreasing its diameter downward from the top end 1a and extending to a position near a constricted portion 1c. The lower aperture 7 is formed as having a taper decreasing its diameter upward from the bottom end 1b and extending to a position near the constricted portion 1c.

The skin layer 3 is formed of nylon and arranged so as to cover the external surface of the core portion 2. The external surface of the skin layer 3 is wholly coated by a primer and a clear coating as well as is applied by two red lines around the constricted portion 1c. The outline of the core portion 2 and that of the skin layer 3 are substantially analogous to each other and the outline of the skin layer 3 is formed so that it is adapted to the specification of the bowling pin. In usual, the material forming the skin layer 3 includes several kinds of strengthening materials so that the bowling pin can withstand excessive impacts.

Figure 2:
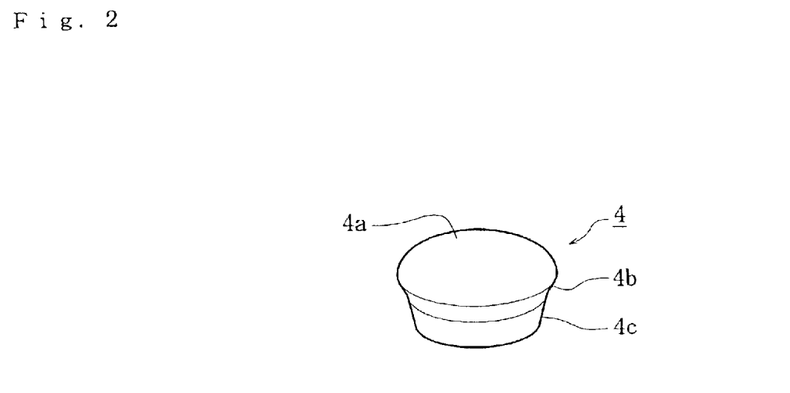
FIG. 2 is a perspective view showing a top plug applied to the plastic bowling pin according to the first embodiment of the present invention.

The top plug 4 is adapted to be press fitted into openings of the upper aperture 6 and the top surface 4a of the top plug 4 is rounded so that it can form the top of the bowling pin 1 as shown in FIG. 2. In addition, the top plug 4 has a peripheral surface 4b substantially corresponding to a trimmed surface 3a (FIG. 1) formed on the opening of the skin layer 3 and a, peripheral surface 4c substantially corresponding to the diameter of the upper aperture 6 of the core portion 2.

Figure 3:
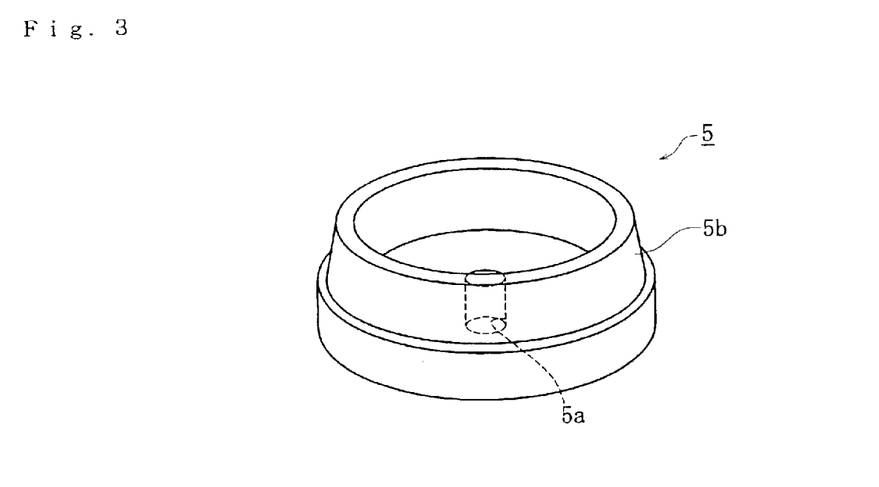
FIG. 3 is a perspective view showing a bottom plug applied to the plastic bowling pin according to the first embodiment of the present invention.

The bottom plug 5 has, as shown in FIG. 3, a flat bottom surface forming the bottom of the bowling pin 1, an aperture 5a extending through the bottom surface, and an upstanding annular portion 5b of which peripheral surface is formed so that its dimension substantially corresponds to that of the opening of the lower aperture 7.

A method for manufacturing the plastic bowling pin 1 of the first embodiment will be hereinafter described.

The method for manufacturing the plastic bowling pin 1 of the first embodiment generally comprises a core portion molding step for molding the core portion 2 carried out by using a first mold and a skin layer molding step for molding the skin layer 3 carried out by using a second mold. Details of the first and second molds will be hereinafter described.

Figure 4:
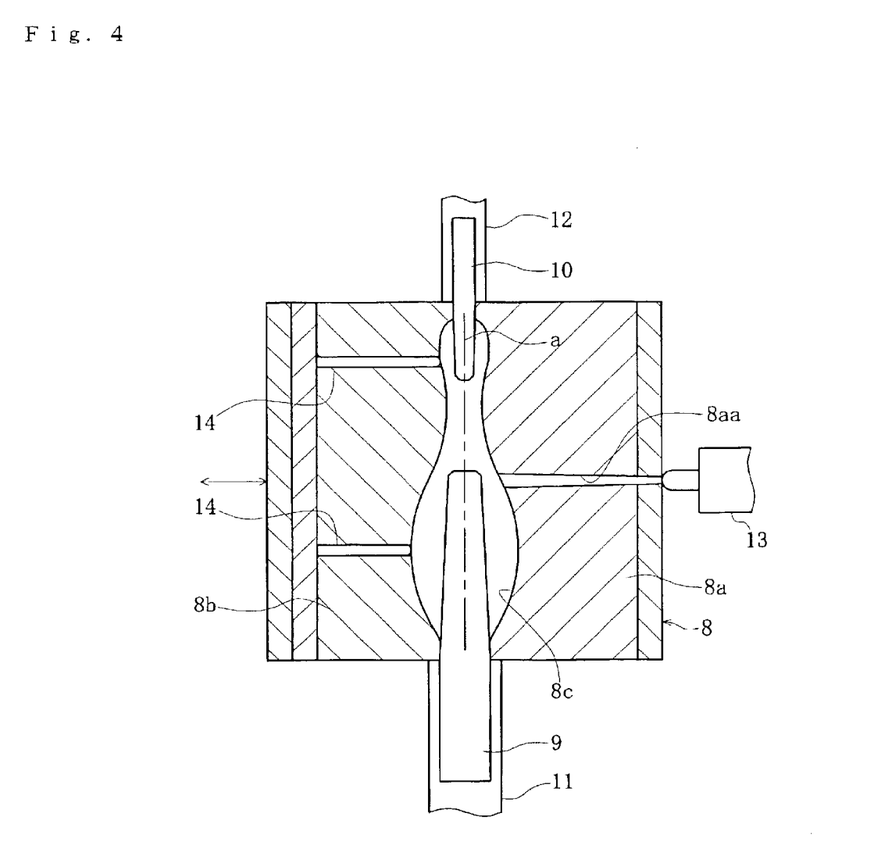
FIG. 4 is a schematic cross-sectional view showing a first mold applied to the method for manufacturing the plastic bowling pin according to the first embodiment of the present invention.

The core molding step is carried out by using the first mold 8 shown in FIG. 4. The first mold 8 comprises a stationary mold 8a, a movable mold 8b, a lower part 9 of first axial rods and an upper part 10 of the first axial rods. These mold elements defines a first molding cavity 8c having a configuration substantially corresponding to the outline configuration of the core portion 2 and thus smaller than the predetermined outline configuration of the finished plastic bowling pin 1 by the thickness of the skin layer 3. Each of the lower part 9 and the upper part 10 of the first axial rods has a predetermined diameter for obtaining the ruled specification such as the weight etc. of the bowling pin 1 and can displace into and from the first molding cavity 8c along a longitudinal axis "a".

The stationary mold 8a is formed with a runner 8a a communicating an injection cylinder 13 of a molding machine with the first molding cavity 8c. The molten synthetic resin can be injected by the cylinder 13 to the molding cavity 8c.

The movable mold 8b is driven by any driving means (not shown) so as to be separated from the stationary mold 8a and contacted to it for forming the first molding cavity 8c. A plurality of ejector pins 14 are arranged within the movable mold 8b for removing the solidified core portion 2 from the first mold 8.

The lower part 9 and the upper part 10 of the first axial rods are formed by a pair of bar members each being displaceable into and from the opposite ends of the first molding cavity 8c and having a draft of reducing diameter toward upward and downward and driven by hydraulic cylinders 11 and 12 respectively. The diameters of the lower part 9 and the upper part 10 of the first rods are determined so that the finished plastic bowling pin 1 has a weight ruled in the specification.

That is, these diameters are determined so that the sum of volumes of the lower aperture 7 and the upper aperture 6 can achieve the optimum weight of the finished bowling pin.

In the core portion molding step using the first mold 8, the molten synthetic resin (mixture of nylon and PP) is injected by the cylinder 13 under a condition in which the lower and upper parts 9 and 10 of the first axial rods are inserted in the first cavity 8c.

After the synthetic resin has been solidified, the lower and upper parts 9 and 10 of the first axial rods are withdrawn by the hydraulic cylinders 11 and 12 from the first molding cavity 8c and the movable mold 8b is separated from the stationary mold 8a. Then the ejector pins 14 are projected toward the molding cavity 8c to remove the molded core portion 2 from the first mold 8. In this condition, the finished core portion 2 has the lower aperture 7 formed by the lower part 9 of the first axial rods and the upper aperture 6 formed by the upper part 10 of the first axial rods.

Figure 5:
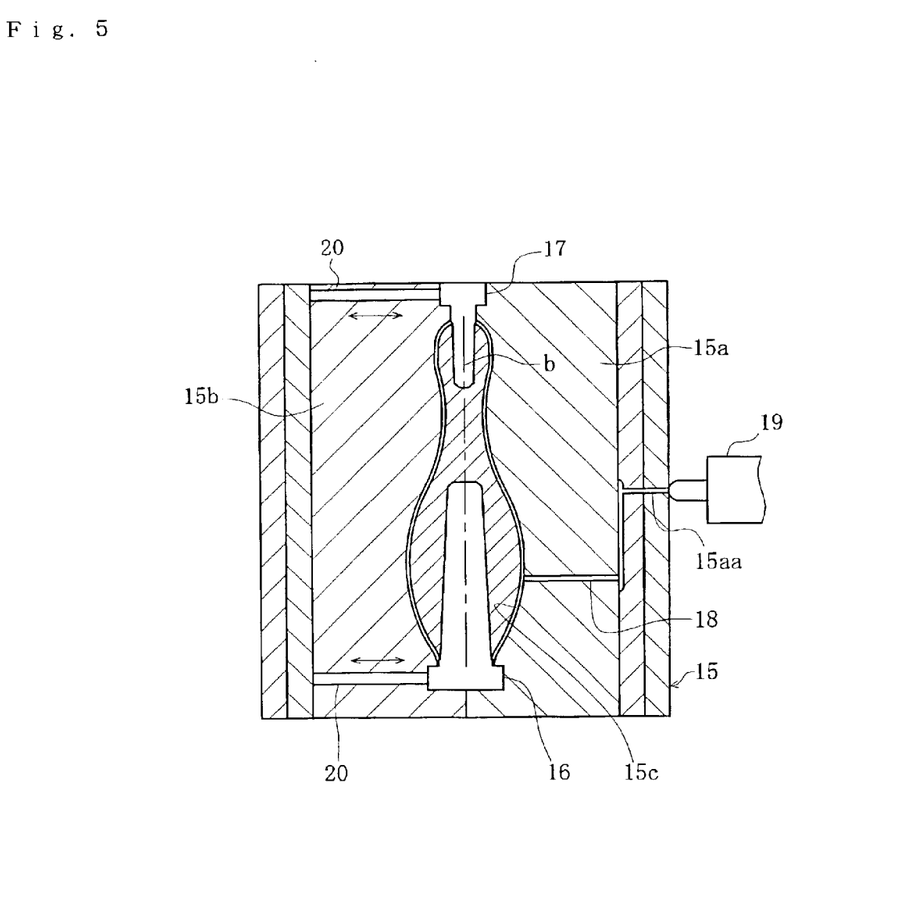
FIG. 5 is a schematic cross-sectional view showing a second mold applied to the method for manufacturing the plastic bowling pin according to the first embodiment of the present invention.

The skin layer molding step is carried out by using a second mold 15 shown in FIG. 5. The second mold 15 comprises a stationary mold 15a, a movable mold 15b, a lower part 16 of second axial rods, and an upper part 17 of the second axial rods. These mold elements defines a second molding cavity 15c having a configuration substantially corresponding to the outline configuration of the finished plastic bowling pin 1. The lower part 16 and the upper part 17 of the second axial rods have diameters substantially corresponding to the diameters respectively of the lower aperture 7 and the upper aperture 6 formed by the core portion molding step and can displace into and from the second molding cavity 15c along a longitudinal axis "b" thereof.

The stationary mold 15a is formed with a gate portion 18 communicating with a runner 15aa and the second molding cavity 15c for connecting an injection cylinder 19 of a molding machine and the second cavity 15c. Similarly to the molding of the core portion 2, the molten synthetic resin can be injected by the cylinder 19 to the second molding cavity 15c.

An outlet port of the gate portion 18 arranged on the wall of the cavity 15c is positioned at a position out of the center of gravity of the bowling pin 1 (e.g. at a position offset downward from the center of gravity of the bowling pin 1). Thus, it is possible to ensure the rigidity of the bowling pin at the position of the center of gravity (i.e. the position at which the bowling pin suffers from the most severe impact).

When the outlet port of the gate portion 18 is at the position offset downward from the center of gravity of the bowling pin 1, it is possible to fill the molten synthetic resin into every nook and corner of the molding cavity 15c and thus to maintain a higher filling efficiency.

The movable mold 15b is driven by any driving means (not shown) so as to be separated from the stationary mold 15a and contacted to it for forming the second molding cavity 15c. A plurality of ejector pins 20 are arranged within the movable mold 15b for removing the molded bowling pin 1 in which the skin layer 3 has been molded on the core portion 2 with keeping the lower and upper parts 16 and 17 of the second axial rods held on the bowling pin 1.

Figure 6:
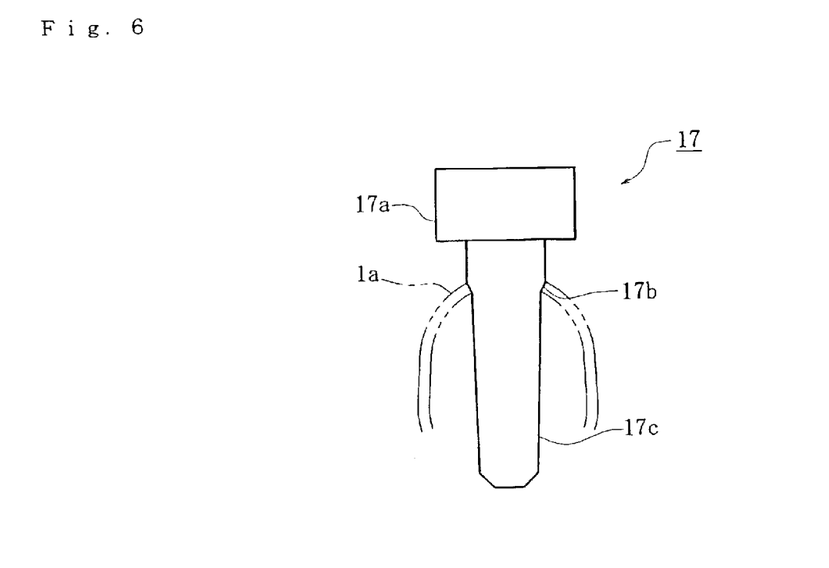
FIG. 6 is a schematic view showing an upper part of the second axial rods arranged in the second mold.
Figure 7:
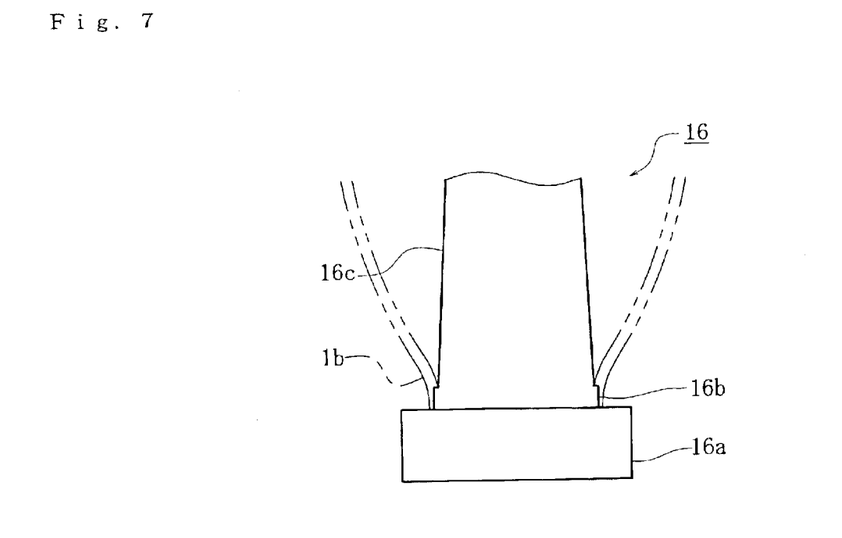
FIG. 7 is a schematic view showing a lower part of the second axial rods arranged in the second mold.

The lower part 16 and the upper part 17 of the second axial rods are formed by a pair of bar members each being displaceable into and from the opposite sides of the second molding cavity 15c and having a draft of reducing diameter toward upward and downward as shown in FIGS. 5 through 7. The upper part 17 of the second axial rods comprises, as shown in FIG. 6, a base 17a to which the ejector pin 20 is abutted, a trimmed surface molding portion 17b for molding the trimmed surface 3a (FIG. 1) of the skin layer 3, and a bar member 17c adapted to be fitted in the upper aperture 6 of the core portion 2.

The lower part 16 of the second axial rods comprises, as shown in FIG. 7, a base 16a, an opening molding portion 16b for molding the opening configuration of the skin layer 3, and a bar member 16c adapted to be fitted in the lower aperture 7 of the core portion 2. Accordingly, since the skin layer 3 is formed as shown by dotted lines in FIGS. 6 and 7, the bar members 17c and 16c can be positioned entirely within the molded core portion 2.

In the skin layer molding step using the second mold 15, the positioning of the core portion 2 relative to the second mold 15 is carried out by inserting the lower and upper parts 16 and 17 of the second axial rods respectively into the lower and upper apertures 7 and 6 of the core portion 2 respectively formed by the lower and upper parts 9 and 10 of the first axial rods of the first mold 8.

Since the lower and upper parts 16 and 17 of the second axial rods are arranged at predetermined positions of the second molds 15, it is possible to easily position the core portion 2 at the center of the second molding cavity 15c by using these parts 16 and 17 as positioning pins. That is, the lower and upper bar members 16c and 17c of the second axial rods perform the positioning function and the opening molding portion 16b and the trimmed surface molding portion 17b perform the core function in synthetic resin molding.

Then the molten synthetic resin is forced into the space formed between the wall of the molding cavity 15c and the external surface of the core portion 2. After the synthetic resin has been solidified onto the external surface of the core 2, the movable mold 15b is separated from the stationary mold 15a and then the ejector pins 20 are projected toward the molding cavity 15c. The finished article i.e. the bowling pin can be removed from the second mold 15 together with the lower and upper parts 16 and 17 of the second axial rods.

Then the lower and upper parts 16 and 17 of the second axial rods are pulled out respectively from the lower and upper apertures 7 and 6. The external surface of the skin layer 3 of the molded bowling pin is wholly coated by a primer and a clear coating as well as is applied by two red lines around the constricted portion 1c. The finished plastic bowling pin 1 can be thus obtained by finally press fitting the upper and lower plugs 4 and 5 into the upper and lower apertures 6 and 7, respectively.

It will be appreciated from the description above that the upper and lower apertures 6 and 7 perform functions of controlling the weight of the bowling pin and of positioning of the core portion 2 relative to the second mold 15. In addition, since the presence of the apertures 6 and 7 can contribute to the reduction of the mass i.e. the thickness of the bowling pin, it is possible to avoid the generation of the sink marks during its molding.

Then it will be described a plastic bowling pin and a method for manufacturing the bowling pin according to a second embodiment of the present invention. Same reference numerals are used herein for designating same structural elements used in the previous embodiment.

Figure 8:
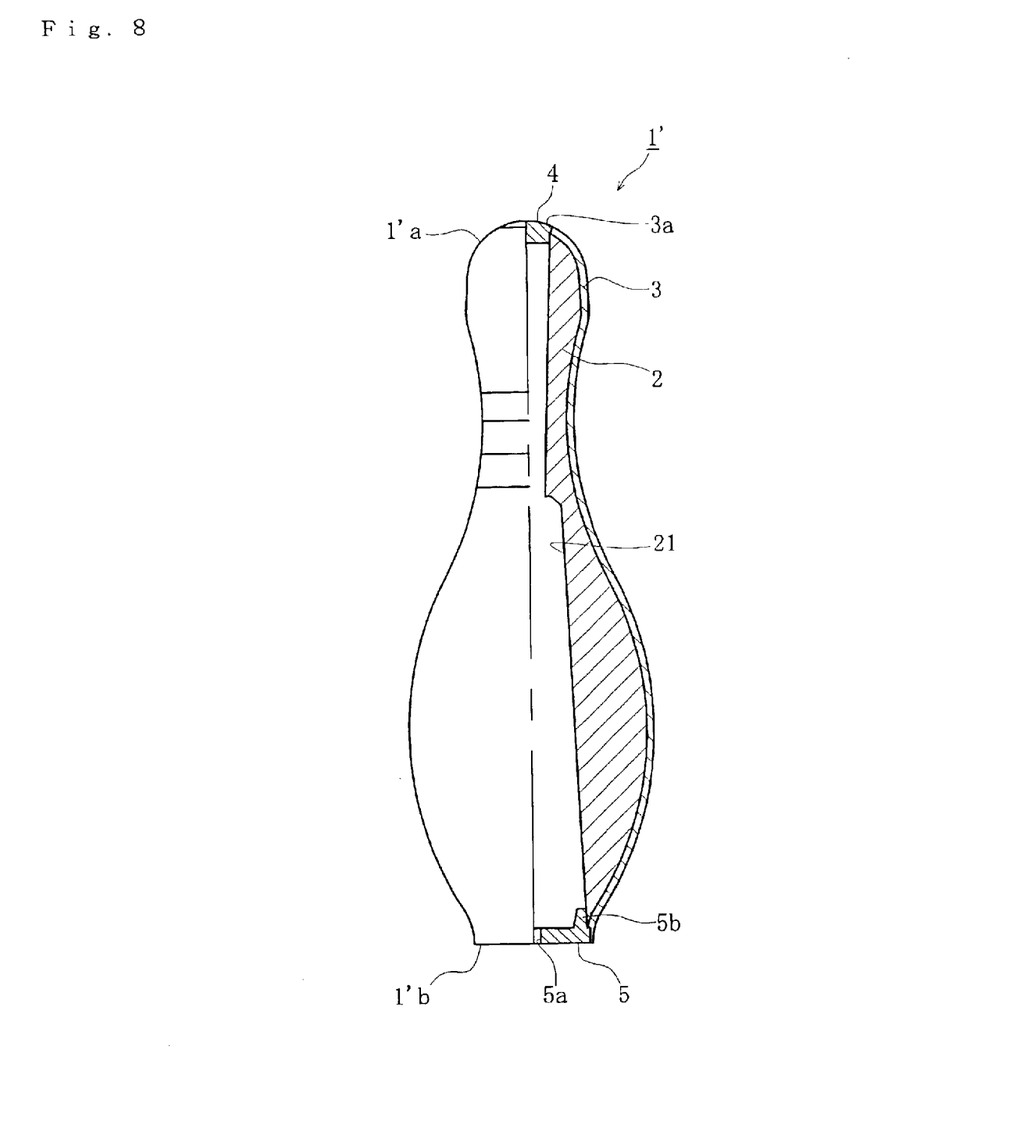
FIG. 8 is a side elevational view partially in section of a plastic bowling pin according to a second embodiment of the present invention.

The plastic bowling pin 1' according to the second embodiment of the invention comprises a through aperture 21 extending along its longitudinal axis as shown in FIG. 8. That is, the through aperture 21 is formed by connecting the upper aperture 6 and the lower aperture 7 of the first embodiment at their tip ends so as to extending from the top end 1'a to the bottom end 1'b. The other portions are same as those in the first embodiment and therefore descriptions of them will be omitted.

Figure 9:
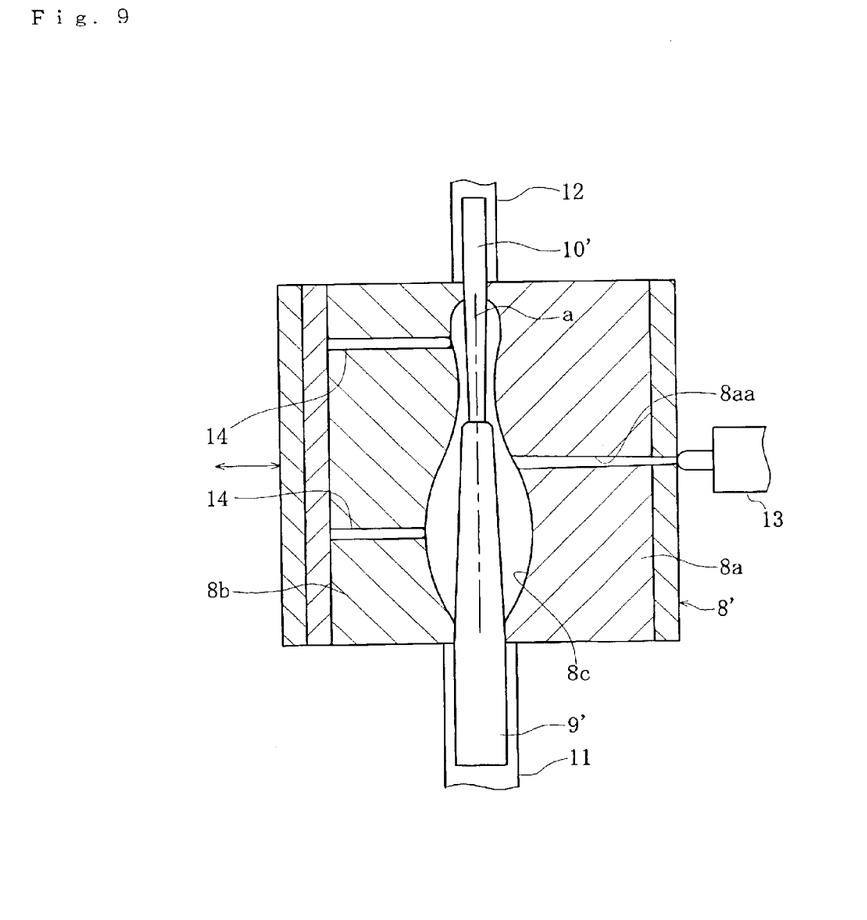
FIG. 9 is a schematic cross-sectional view showing a first mold applied to a method for manufacturing the plastic bowling pin according to the second embodiment of the present invention.
Figure 10:
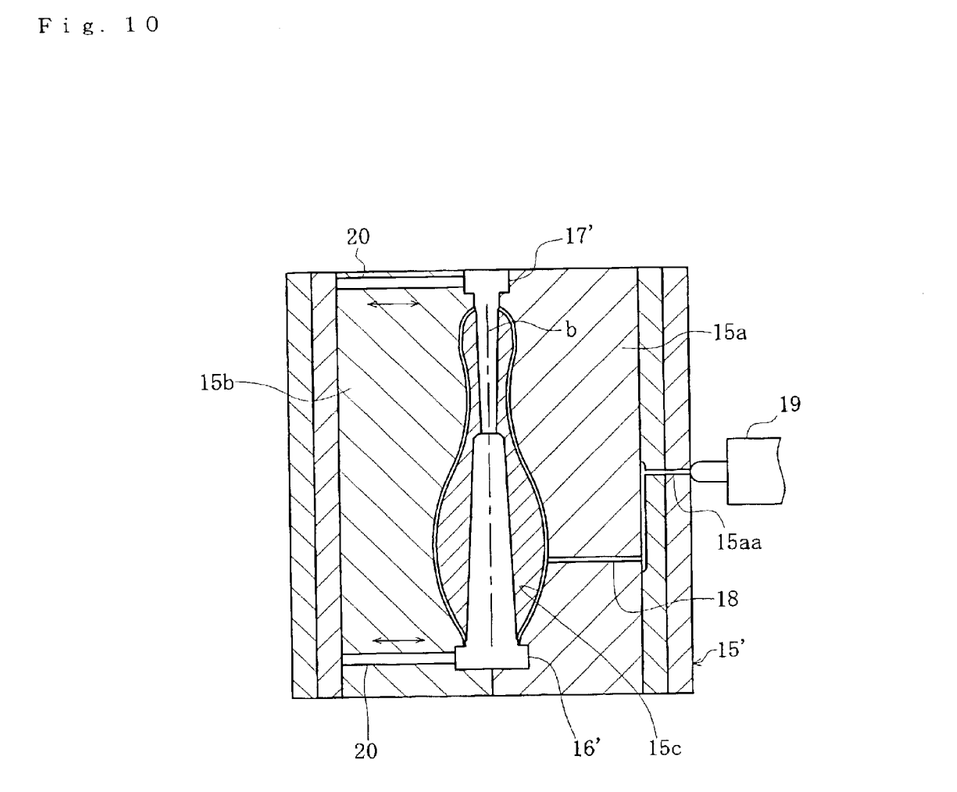
FIG. 10 is a schematic cross-sectional view showing a second mold applied to a method for manufacturing the plastic bowling pin according to the second embodiment of the present invention.

The plastic bowling pin 1' is formed by using a first mold 8' shown in FIG. 9 and a second mold 15' shown in FIG. 10. The first mold 8' has lower and upper parts 9' and 10' of the first axial rods and the second mold 15' has lower and upper parts 16' and 17' of the second axial rods. The tip ends of these first and second axial rods can be abutted with each other as shown in FIGS. 9 and 10.

In the step for molding the core portion 2, the molten synthetic resin is injected into the first mold 8' under a condition wherein the tip ends of the lower and upper parts 9' and 10' of the first axial rods are abutted with each other, and in the step for molding the skin layer 3, the molten synthetic resin is injected into the second mold 15' under a condition wherein the tip ends of the lower and upper parts 16' and 17' of the second axial rods are abutted with each other. The other steps for manufacturing the plastic bowling pin 1' are same as those in manufacturing the bowling pin 1 in the first embodiment.

According to the second embodiment of the present invention, it is also possible to easily manufacture the plastic bowling pin which has the ruled weight and high quality without any sink mark.

Then it will be described a plastic bowling pin and a method for manufacturing the bowling pin according to a third embodiment of the present invention. Same reference numerals are used herein for designating same structural elements used in the previous embodiments.

Figure 11:
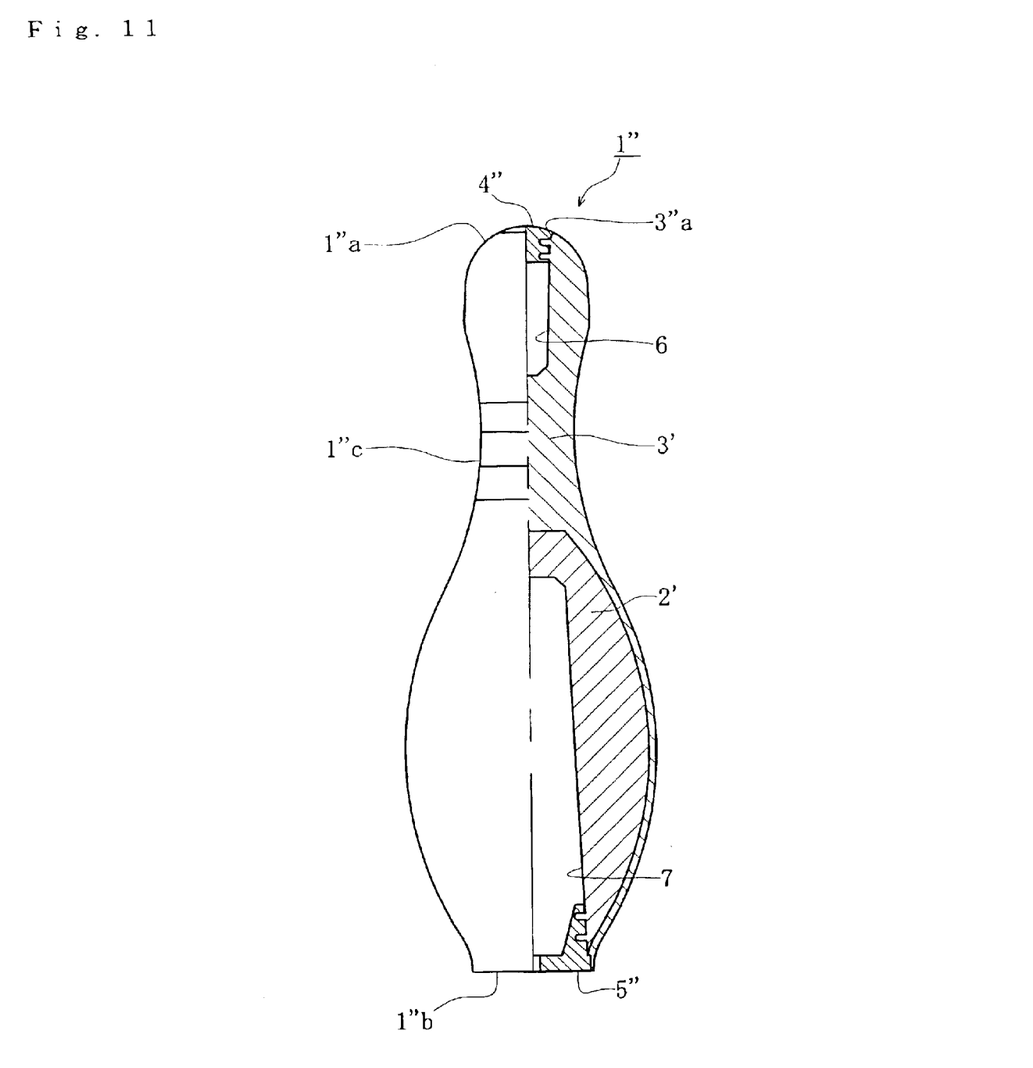
FIG. 11 is a side elevational view partially in section of a plastic bowling pin according to a third embodiment of the present invention.

The plastic bowling pin 1" of the third embodiment as shown in FIG. 11, has a core portion 2' which is arranged in the lower portion 1"b of the bowling pin 1" and a skin layer 3' which covers the core portion 2' at the lower portion of the bowling pin 1" and is molded to the ruled outline configuration of the bowling pin 1" at the upper portion 1"a. Similarly to the bowling pin 1 of first embodiment, the bowling pin 1" of this embodiment has a lower aperture 7 extending upward from the bottom end 1"b within the core portion 2' and upper aperture 6 extending downward from the top end 1"a within the skin layer 3'.

Figure 12:
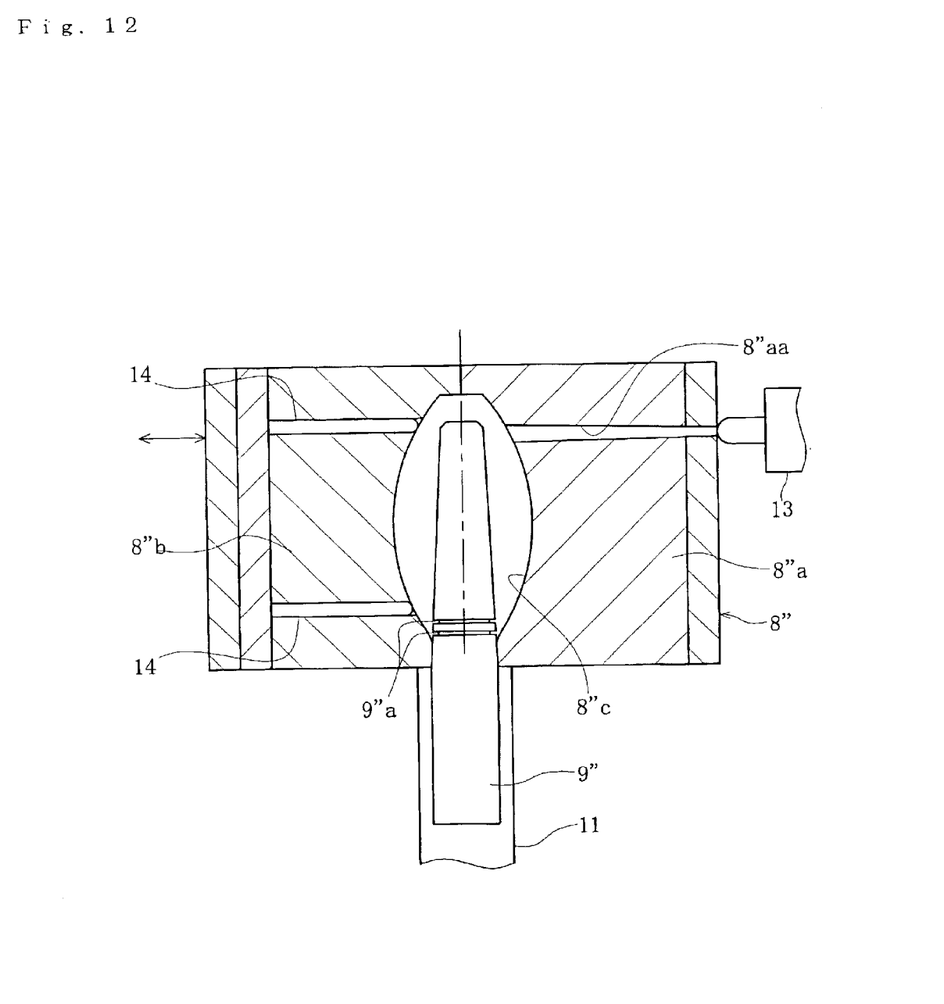
FIG. 12 is a schematic cross-sectional view showing a first mold applied to a method for manufacturing the plastic bowling pin according to the third embodiment of the present invention.
Figure 13:
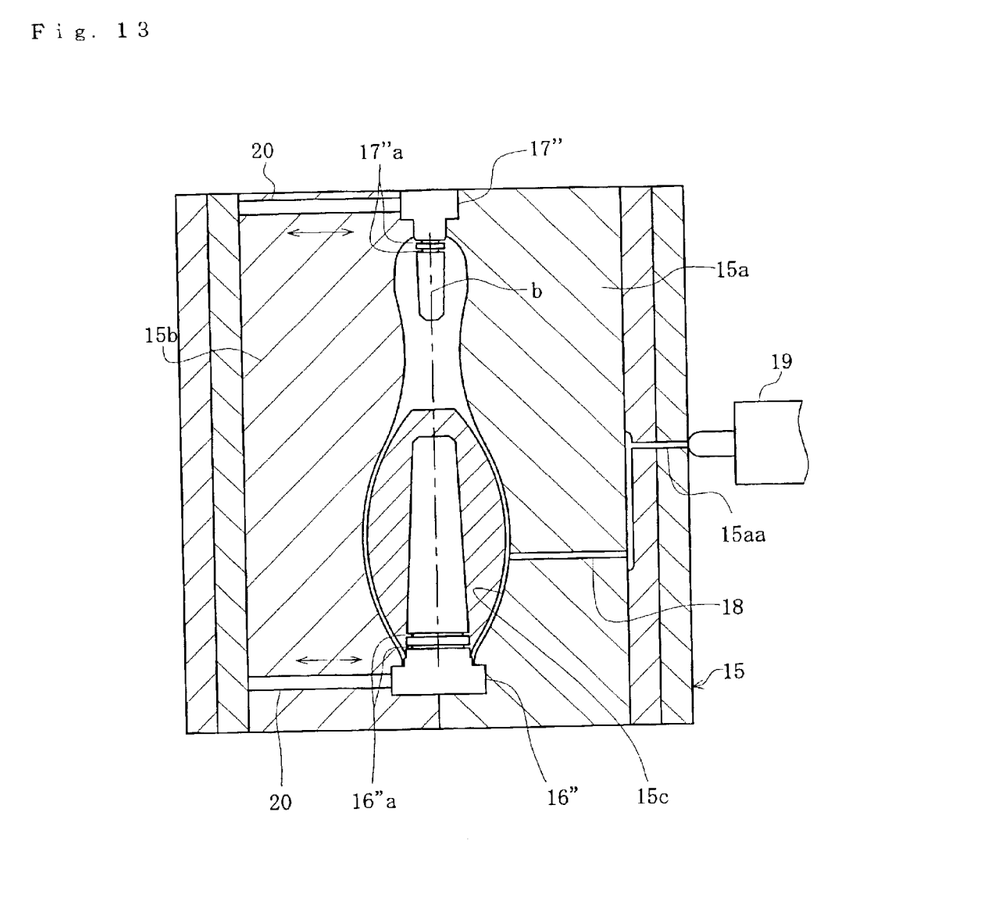
FIG. 13 is a schematic cross-sectional view showing a second mold applied to a method for manufacturing the plastic bowling pin according to the third embodiment of the present invention.

The plastic bowling pin 1" can be manufactured through the core portion molding step using a first mold 8" shown in FIG. 12 and the skin layer molding step using a second mold 15 shown in FIG. 13 which is substantially identical to the second mold 15 used in the first embodiment. Descriptions as to structural elements same as those shown in the foregoing embodiments will be omitted.

The step for molding the core portion 2' is carried out by using the first mold 8" shown in FIG. 12. The first mold 8" comprises a stationary mold 8"a, a movable mold 8"b, and a lower part 9" of first axial rods. These mold elements defines a first molding cavity 8"c having a configuration substantially corresponding to the outline configuration of the core portion 2' and thus smaller than the predetermined outline configuration of the finished plastic bowling pin 1" by the thickness of the skin layer 3. The lower part 9" of the first axial rods can displace into and from the first molding cavity 8"c along a longitudinal axis "a" thereof.

The stationary mold 8a is formed with a runner 8"aa communicating the injection cylinder 13 of a molding machine with the first molding cavity 8"c. After the movable mold 8"b has been driven by any driving means (not shown) so as to be contacted to the stationary mold 8"a for forming the first molding cavity 8"c, the molten synthetic resin can be injected by the cylinder 13 to the molding cavity 8"c under a condition (FIG. 12) in which the lower part 9" of the first axial rod is inserted in the first cavity 8"c by the hydraulic cylinder 11.

Figure 15:
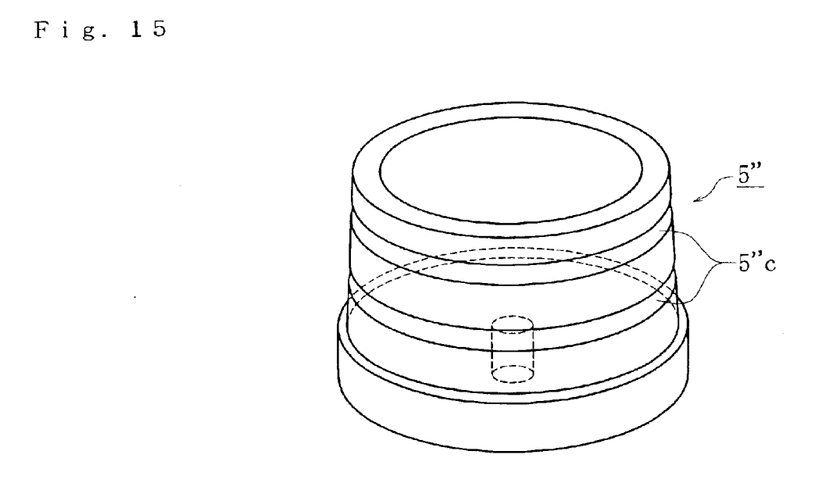
FIG. 15 is a perspective view showing a bottom plug applied to the plastic bowling pin according to the third embodiment of the present invention.

A plurality of annular grooves 9"a (preferably two or three) are formed at the base of the lower part 9" of the axial rods to form annular projections on the wall within the lower aperture 7 of the core portion 2' for increasing the mutual fitting force with recessed grooves 5"c (FIG. 15) formed on the peripheral surface of the bottom plug 5". Each cross-sectional configuration of the grooves 9"a may be any one of a rectangular, U- or V-shape.

The core portion 2' can be removed from the first mold 8" by separating the movable mold 8"b from the stationary mold 8"a and by projecting the ejector pins 14 toward the molding cavity 8".

Figure 14:
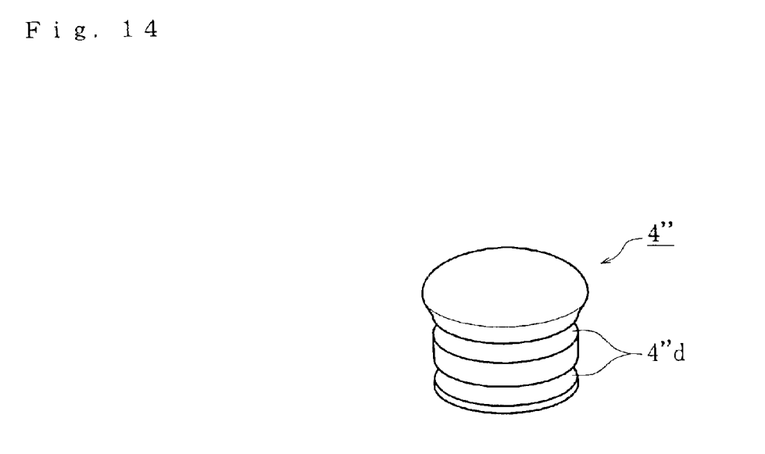
FIG. 14 is a perspective view showing a top plug applied to the plastic bowling pin according to the third embodiment of the present invention.

The skin layer molding step can be carried out by using the second mold 15 shown in FIG. 13. The second mold 15 comprises the stationary mold 15a, the movable mold 15b, and lower and upper parts 16" and 17" of the second axial rods. These mold elements, defines the second molding cavity 15c having a configuration substantially corresponding to the outline configuration of the finished bowling pin 1. The lower and upper parts 16" and 17" of the second axial rods can displace into and from the second molding cavity 15c along a longitudinal axis "b" thereof. Similarly to the lower part 16" of the second axial rods, the upper part 17" of the second axial rods is formed at the base thereof with annular grooves 17"a to form projections on the wall within the upper aperture 6 for increasing the mutual fitting force with recessed grooves 4'd (FIG. 14) formed on the peripheral surface of the top plug 4".

After the skin layer has been cooled and solidified, the external surface of the skin layer is wholly coated by a primer and a clear coating as well as is applied by two red lines around the constricted portion 1c similarly to the previous embodiments.

A top plug 4" (FIG. 14) and a bottom plug 5" (FIG. 15) are press fitted to openings of the upper aperture 6 and the lower aperture 7 respectively to obtain the finished plastic bowling pin 1". Grooves 4"d and 5"c are formed on the peripheral surfaces of the top and bottom plugs 4" and 5" respectively. These grooves 4"d and 5"c are fitted on the annular projections formed by the grooves 17"a and 9"a of the upper part 17" of the second axial rods and the lower part 9" of the first axial rod for increasing the mating force therebetween.

Although the first embodiment through third embodiment of the present invention have been described, these embodiments are illustrated only for the description of the present invention and do not limit in any sense the scope and spirit of the present invention. For example, the first axial rods and the second axial rods can be formed respectively by a single bar member extending from the under side of the mold. In this case, only one aperture is formed within the bowling pin at the bottom end side thereof. In addition, when manufacturing the plastic bowling pin having a single through aperture, the two parts of the first axial rods of the second embodiment can be replaced by one bar member extending upward or downward.

What is claimed is:

1. A method for manufacturing a plastic bowling pin using a first mold having a first molding cavity of a smaller dimension than the predetermined outside dimension of the bowling pin and having a first pair of axial rods each having a predetermined diameter and displaceable into and from the first molding cavity along a longitudinal axis, and a second mold having a second molding cavity of a substantially same dimension as the outside dimension of the bowling pin and having a pair of second axial rods each having a predetermined diameter and displaceable into and from the second molding cavity along a longitudinal axis comprising:

molding a core portion of the bowling pin by forcing molten synthetic resin to be flowed into the first molding cavity of the first mold after the first pair of axial rods has been inserted into the first molding cavity forming a substantial void in said bowling pin from both top and bottom of said bowling pin;

removing the first pair of axial rods therefrom after the synthetic resin has been solidified; and molding a skin layer on the external surface of the molded core portion by forcing molten synthetic resin to be flowed into a space between the external surface of the molded core portion and the second molding cavity of the second mold after the molded core portion has been positioned relative to the second molding cavity with inserting the second pair of axial rods into apertures formed in the core portion by the first pair of axial rods and forming apertures in said top and bottom of said bowling pin requiring a plug in each aperture.

2. The method of claim 1 further comprising a step of press fitting plastic plugs into the apertures formed in the bowling pin by the first and second axial rods after the skin layer has been molded.

3. The method of claim 1 further comprising forming said first and second axial rods, respectively, by a pair of bar members each displaceable into and from the opposite ends of the first and second molding cavities of the first and second molds.

4. The method of claim 3 wherein the pair of said bar members of the first axial rods are adapted to be abutted at their tip ends, and said core portion molding step is carried out under a condition of the tip ends being abutted.

5. The method of claim 1 further comprising injecting said forced flow of the molten synthetic resin into the first and second molding cavities, and the injection in the skin layer molding step is carried out at a position out of the center of gravity of the bowling pin.

* * * * *